United States Patent [19]

Braunstein

[11] 4,023,143
[45] May 10, 1977

[54] FIXED PRIORITY INTERRUPT CONTROL CIRCUIT

[75] Inventor: Gerald Paul Braunstein, Cincinnati, Ohio

[73] Assignee: Cincinnati Milacron Inc., Cincinnati, Ohio

[22] Filed: Oct. 28, 1975

[21] Appl. No.: 626,570

[52] U.S. Cl. .......................................... 340/172.5
[51] Int. Cl.² ...................... G06F 3/04; G06F 9/18
[58] Field of Search ...................... 340/172.5; 445/1

[56] References Cited
UNITED STATES PATENTS

| | | | |
|---|---|---|---|
| 3,221,309 | 11/1965 | Benghiat | 340/172.5 |
| 3,293,616 | 12/1966 | Mullery et al. | 340/172.5 |
| 3,395,394 | 7/1968 | Cottrell, Jr. | 340/172.5 |
| 3,399,384 | 8/1968 | Crockett et al. | 340/172.5 |
| 3,453,600 | 7/1969 | Stafford et al. | 340/172.5 |
| 3,456,244 | 7/1969 | Seichter et al. | 340/172.5 |
| 3,534,339 | 10/1970 | Rosenblatt | 340/172.5 |
| 3,544,974 | 12/1970 | Tan | 340/172.5 |
| 3,689,897 | 9/1972 | Sciuchetti | 340/172.5 |
| 3,866,181 | 2/1975 | Gayman et al. | 340/172.5 |

Primary Examiner—Melvin B. Chapnick
Attorney, Agent, or Firm—C. Richard Eby

[57] ABSTRACT

An apparatus for controlling the transmission of multiple level priority interrupt signals to a central processing unit. A number of storage elements are responsive to the interrupt signals on an individual basis. A last-in first-out memory having an output connected to the processing unit stores storing the interrupt signals in order of descending priorities. A comparator circuit compares the priority of a new interrupt signal in the storage element with the highest priority interrupt signal currently in the memory. If the new interrupt signal is of the same or a higher priority, an interrupt request signal is sent to the processing unit. Subsequently, the processing unit returns an acknowledge signal which is operative to load the new interrupt signal into the memory, thereby providing the new interrupt signal as an output therefrom. The acknowledge signal also resets the storage element associated with the new interrupt signal. If the priority of the new interrupt signal is not higher than the highest priority signal in the memory, the new interrupt signal remains in its storage element until such time that its priority level exceeds the highest priority interrupt signal in the memory. After executing the sub-routine called for by the new interrupt signal, the processing unit produces a reset signal which causes the next highest priority interrupt signal to be output from the memory.

6 Claims, 2 Drawing Figures

FIXED PRIORITY INTERRUPT CONTROL CIRCUIT

BACKGROUND OF THE INVENTION

The invention relates generally to priority interrupt control circuits; and specifically, the invention provides a circuit for handling a number of randomly occurring interrupt signals and providing these signals to a central processing unit on the basis of their priority.

Every computer system requires that the processing unit respond to a number of different conditions and devices on a random basis. Such devices include peripheral devices operating in conjunction with the processing unit, and such conditions include power failure, start-up procedures, programming errors, and other fault conditions which may occur. These conditions and devices request the attention of the processing unit by generating interrupt signals. The interrupt signals may be recognized in many ways, e.g., first-come first-served basis, a first-come first-ready first-served basis, a straight priority basis, etc. The disclosed apparatus is applicable to a straight priority system. In this case, each interrupt signal is assigned a priority as a function of its importance relative to the other interrupt signals. The apparatus is operative to receive the interrupt signals, separate them on the basis of priority, and transmit them to the processing unit in order of descending priority.

There is substantial prior art in the area of priority interrupt control systems. Further, the philosophy of handling priority interrupts varies from a fixed priority system which operates on the basis of transmitting the highest priority interrupt signal first to a system in which the priority structure is controlled by an algorithm in the system.

The present disclosure is oriented to a system in which the interrupt signals are handled by apparatus separate from the processing unit and in which the interrupt signals are transferred to the processing unit solely on the basis of priority.

In a typical prior art system, each interrupt signal has its own interrupt circuit. The circuit contains a number of storage elements; and the circuits are chained together in a series circuit in which each circuit is dominant over circuits below it in the chain and subordinate to the circuits above it in the chain. Such an interrupt structure requires great duplicity in the circuit elements.

The disclosed apparatus provides an interrupt structure in which the number of duplicate circuits is greatly reduced thereby providing a substantial economy in the interrupt structure design.

SUMMARY OF THE INVENTION

According to one embodiment of the invention, an apparatus is disclosed for controlling the transfer of interrupt signals to a processing unit according to predetermined levels of priority assigned to the interrupt signals. First means are provided which are responsive to the processing unit for storing the interrupt signals. Said storing means further includes means for resetting a storage element in response to the processing unit accepting a corresponding interrupt signal. A last-in first-out memory is provided which has an input responsive to the storing means, and an output connected to the processing unit. The output of the memory is operative to transfer the highest priority interrupt signal in the memory to the processing unit. Further means are provided which are responsive to the storing means and the processing unit and connected to the memory for transferring a stored interrupt signal to the memory in response to the stored interrupt signal having a priority at least as high as the highest priority interrupt signal currently in the memory. The transfer of the stored interrupt signal to the memory results in its being transmitted to the processing unit. Said means further including means for shifting the next highest priority interrupt signal in the memory to the memory output in response to said processing unit executing the operation defined by the stored interrupt signal.

DESCRIPTION OF THE PREFERRED EMBODIMENT

Figure 1:
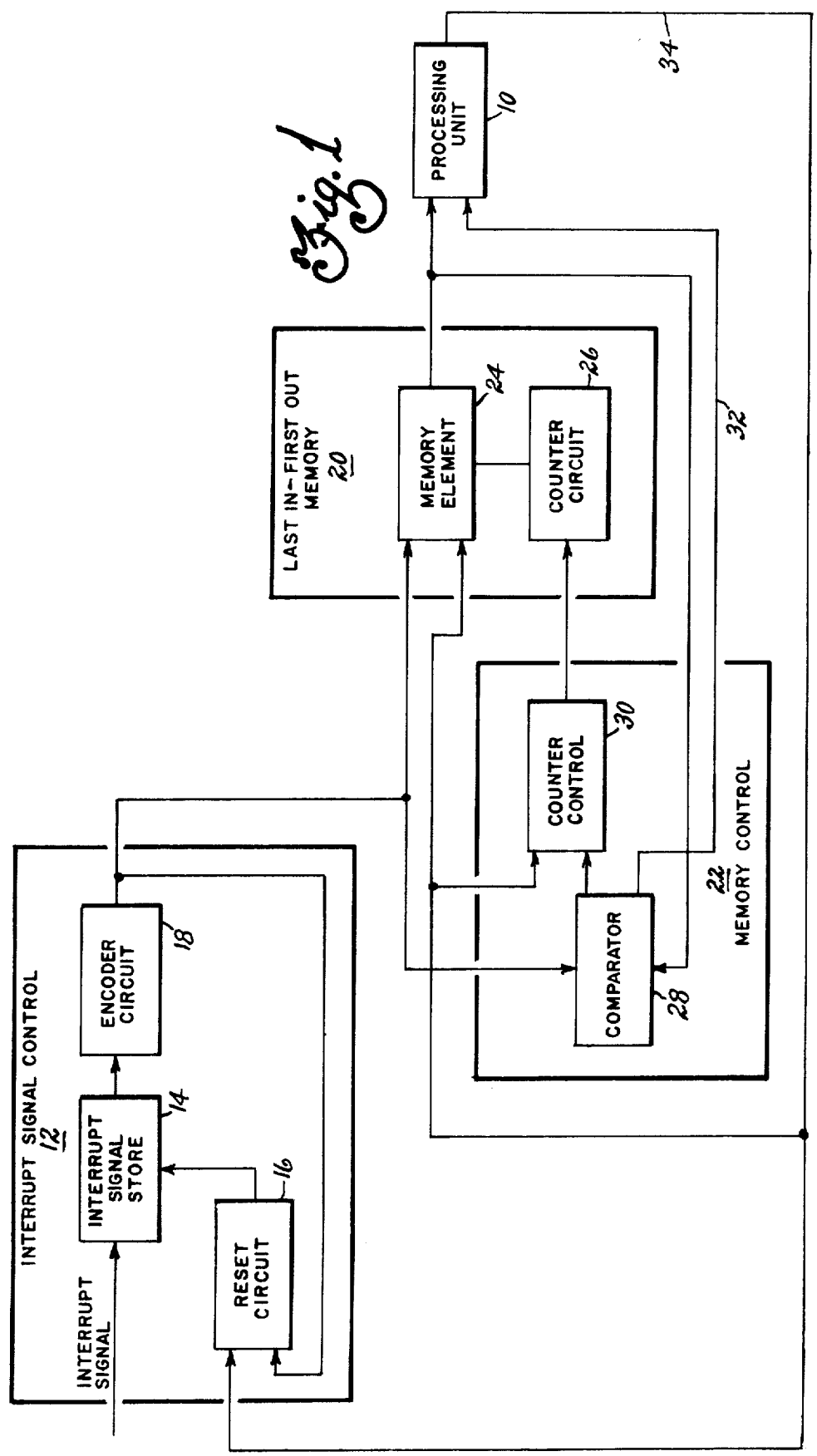
FIG. 1 is a detailed block diagram of the circuit elements required for the disclosed priority interrupt control circuit.

FIG. 1 is a detailed block diagram illustrating the priority interrupt control circuit disclosed herein. A central processing unit 10 performs computational functions under the instructions of a program control. In the interest of efficiency, many other units within the system operate simultaneously and independently of the processing unit 10. However, it is required that many times the other units operate in conjunction with the processing unit 10. This requirement occurs on a random basis which is not subject to any absolute program control. For example, failure conditions may occur at any time. To gain access to the processing unit 10, conditions and devices generate interrupt signals.

An interrupt signal is an input to an interrupt signal control 12 comprised of an interrupt signal store 14, an associated reset circuit 16 and an encoder circuit 18. Within the interrupt signal store 14, a particular storage element is uniquely responsive to one of the interrupt signals and produces a stored signal to the encoder circuit 18. As will be appreciated, several interrupt signals may occur at one time; and the encoder circuit is responsive to the highest priority interrupt signal for producing a coded signal on its output which uniquely identifies the highest interrupt signal stored. The coded signal is input to a last-in first-out memory 20 and a memory control 22. The last-in first-out memory 20 is comprised of a memory element 24 and counter circuit 26. The counter circuit 26 controls the operation of the memory element 24 such that it operates on a last-in first-out basis. Signals are stored in the memory element in descending order of priority, and the memory element has an output connected to the processing unit which always points to the highest priority signal contained in the memory.

The memory control 22 is comprised of a comparator circuit 28 and counter control 30. The comparator has one input responsive to the output from the encoder circuit 18, and a second input responsive to the output of the memory 24. The comparator compares the priority of the coded signal from the encoder circuit with the priority of the output signal from the memory 24. Since the output of the memory 24 is always connected to the highest priority signal contained therein, the comparator 28 is effective to compare the priority of the coded signal with the highest priority signal in the memory. If the priority of the coded signal is equal to or higher than the highest priority signal contained in the memory, an interrupt request signal is generated on line 32 to the processing unit 10. At a subsequent time the processing unit 10 generates an acknowledge signal on line 34. The acknowledge signal is operative to first cause the counter control 30 to increment the counter circuit 26 thereby moving the input and output of the memory element to a higher memory location. Next, the coded signal on the output of the encoder circuit 18 is transferred to said higher memory location. Consequently, the coded signal represents the highest priority signal in the memory and is output from the memory to the processing unit 10. Finally, the acknowledge signal from the processing unit 10 is an input to the reset circuit 16 and causes the reset circuit to reset the storage element containing the interrupt signal corresponding to the coded signal loaded in the memory element. After the processing unit executes a subroutine called by the interrupt signal, the processing unit generates a reset signal on line 34. The reset signal is an input to the counter control 30 and causes the counter circuit to decrement thereby moving the input and output of the memory element to a lower memory location. Consequently, an output signal is generated therefrom representing the next highest priority signal. In other words, the output signal which was originally produced by the memory element.

If the comparator 28 determines that the coded signal from the output of the encoder circuit 18 is of a lower priority than the output signal from the memory element 24, the interrupt signal corresponding to said coded signal is held in its storage element. After the processing unit 10 services the interrupt defined by the current output signal from the memory element 24, a reset signal is generated on line 34 to the counter control circuit 30. The counter control circuit decrements the counter circuit 26 thereby moving the input and output of the memory element to the next lower memory location and providing a new output signal therefrom. The comparator 28 compares the priority level of this new output signal from the memory element with the current coded signal from the encoder circuit 18 representing the highest priority interrupt signal currently being stored in the interrupt signal store 14. If the coded signal is of an equal or a higher priority than the new output signal from the memory, it is loaded into the memory by means of the process earlier described and is serviced by the processing unit. If the new output signal is of a higher priority than the coded signal, it is recognized by the processing unit; and after its service is complete, the memory element is decremented to the next lower memory location thereby producing an output signal of a lower priority. The circuit iterates in this manner constantly comparing the priority of newly occurring interrupt signals with the priority of interrupt signals queued in the memory element 24. Therefore, the highest priority interrupt signal is always the first recognized by the processing unit.

Figure 2:
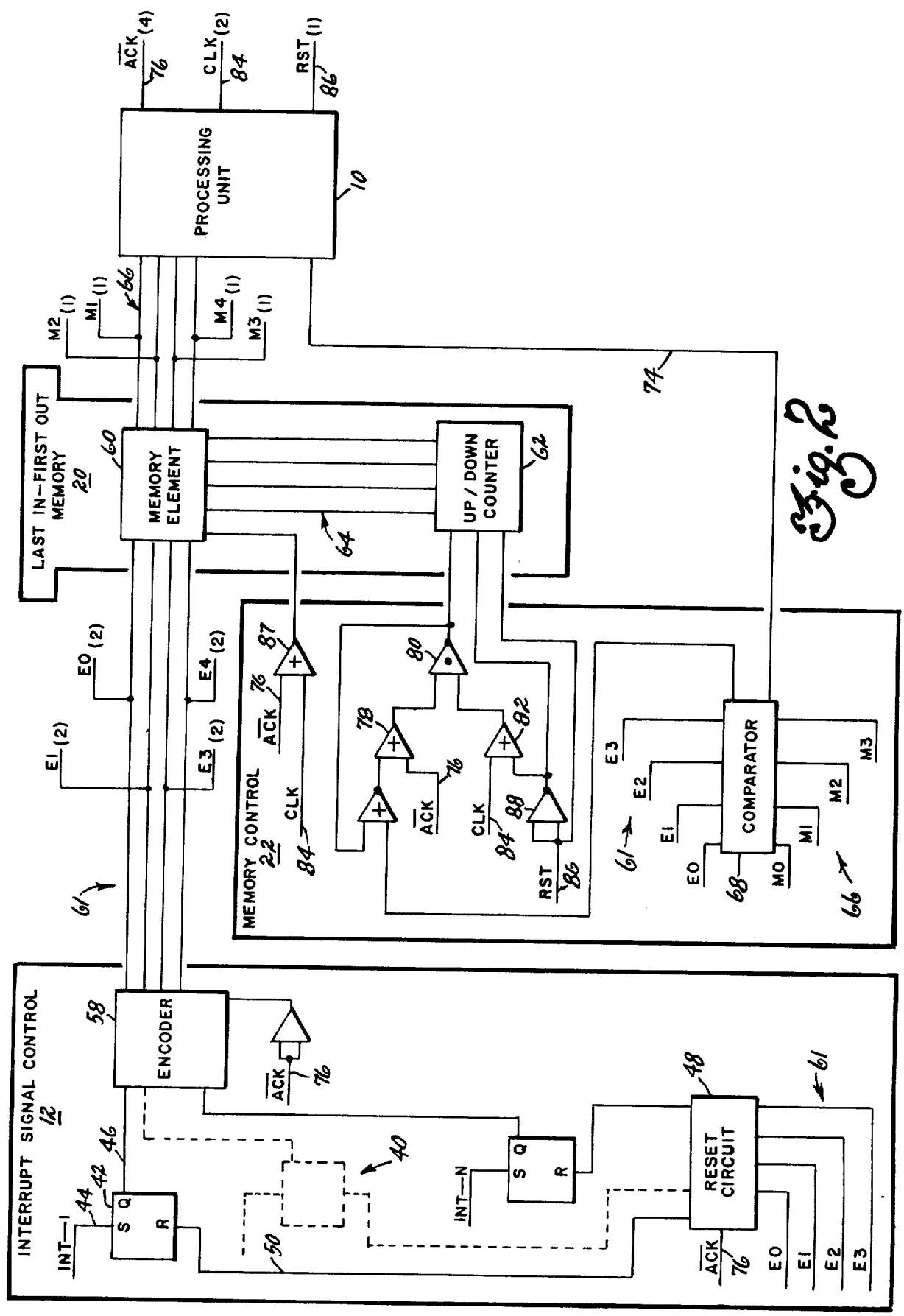
FIG. 2 is a detailed schematic diagram of the priority interrupt control circuit disclosed herein.

FIG. 2 is a detailed schematic diagram of the elements shown in block form in FIG. 1. The interrupt signal control 12 is comprised of a group of flip-flops shown at 40 which operate as an interrupt signal store. The number of flip-flops corresponds to the number of interrupt signals in the system. For convenience, only two flip-flops are shown in detail; but the phantom lines indicate that any number of flip-flops may be used. Examining flip-flop 42 in more detail, the interrupt signal associated with flip-flop 42 is provided on the set input via line 44. Consequently, the occurrence of an interrupt on line 44 will cause a stored interrupt signal to occur on the output of the flip-flop on line 46. A reset input is connected to the reset circuit 48 via a line 50.

An encoder 58 has inputs responsive to each of the flip-flop outputs. The encoder is operative to monitor the flip-flop outputs and produce on its outputs at 61 a coded interrupt signal which corresponds to the highest priority stored interrupt signal on its inputs. The encoder 58 is an integrated circuit device commercially available.

The outputs from the encoder 58 are input to a memory element 60 contained in the last-in first-out memory 20. Connected to the memory element 60 is an up-down counter 62. Each counter state produces a signal on the outputs 64 which address a unique storage location within the memory element 60. Consequently, with each new counter state, a new storage location is addressed which causes the inputs and outputs of the memory element to be connected to the newly addressed storage location. As discussed earlier, the memory element queues the coded interrupt signals in order of descending priority. Consequently, the output interrupt signal from the memory element represents the highest priority signal contained therein.

Within the memory control 22, a comparator 68 has a first set of inputs connected to the outputs 61 of the encoder 58; and a second set of inputs connected to the outputs 66 of the memory element 60. The comparator is operative to compare the magnitude of a coded interrupt signal from the encoder with the magnitude of an output interrupt signal from the memory element 60. If the magnitude of the coded interrupt signal is equal to or greater than the magnitude of the output interrupt signal, i.e., if the priority of the coded interrupt signal is at least as high as the priority of the output interrupt signal, an interrupt request signal is generated on line 74 to the processing unit 10.

When the processing unit recognizes the interrupt request signal, it generates an acknowledge signal on line 76 which is connected to a latch input on the encoder 58, thereby prohibiting the output of the encoder from changing state over the duration of the acknowledge signal. Next, the acknowledge signal is connected to an input of an OR gate 78 which provides an input to a NAND gate 80 having a second input responsive to a clock signal generated through OR gate 82 and originating on line 84 from the processing unit. The data processing unit is operative to generate the clock signal during the occurrence of the acknowledge signal. On the leading edge of the clock signal the up-down counter 62 is counted up one state thereby addressing the next higher storage location in the memory element 60. The acknowledge and clock signals are further connected to an OR gate 87 having an output connected to the clock input of the memory element 60. On the trailing edge of the clock pulse, the coded interrupt signal is loaded from the encoder 58 into the newly addressed storage location of the memory element 60 thereby providing an output interrupt signal from the memory element corresponding to said coded interrupt signal. Finally, the acknowledge signal is connected to an input of the reset circuit 48. The reset circuit has further inputs connected to the output lines 61 from the encoder 58. The reset circuit further has a number of individual outputs each being connected to one of the reset inputs of the flip-flops 40. The inputs on line 61 are operative to identify a particular flip-flop storing an interrupt signal corresponding to the coded interrupt signal from the encoder 58. The acknowledge signal gates an output signal to the reset input of the flip-flop corresponding to the coded interrupt signal. Consequently, the flip-flop is cleared and made available to accept a subsequent interrupt signal.

After generating the acknowledge signal, the processing unit 10 accepts the new output interrupt signal from the memory element and executes a subroutine required by said interrupt. After the completion of the subroutine, the processing unit produces a reset signal on line 86 to an inverter gate 88 within the memory control 22. The reset signal along with a subsequent clock signal decrements the counter 62. The counter 62 addresses the next lower storage location in the memory element 60 thereby producing an output interrupt signal therefrom corresponding to the contents of said memory location. Of course, in this example, the output interrupt signal would correspond to that produced by the memory element before the occurrence of the acknowledge signal.

The situation may occur where the coded interrupt signal from the encoder 58 has a lower priority or a magnitude less than the output interrupt signal from the memory element 60. In this situation, the comparator 68 will not produce an interrupt request signal on line 74. Therefore, the processing unit continues to service the interrupt defined by the current output interrupt signal from the memory element 60. At the completion of this interrupt, the processing unit produces a reset signal on line 86; and as earlier described, the reset signal decrements the counter 62. This new counter state addresses the next lower storage location in the memory element thereby producing an output interrupt signal therefrom having a lower priority. At this time, the comparator 68 compares this lower priority output interrupt signal with the coded interrupt signal from the encoder 58; and if the coded interrupt signal is of an equal or a higher priority, an interrupt request signal is generated. If not, the interrupt signal corresponding to the coded interrupt signal remains stored in its corresponding flip-flop.

The interrupt control circuit operates in the manner heretofore described continuously monitoring newly received interrupt signals. If these newly received interrupt signals have a priority at least as high as the interrupt signals queued in the memory element, they are passed directly on to the processing unit. If not, they are stored in their corresponding flip-flops until such time as the priority of the interrupts queued in the memory element falls to their priority level.

While the invention has been illustrated in some detail according to the preferred embodiments shown in the accompanying drawings, and while the preferred illustrated embodiments have been described in some detail, there is no intention to limit the invention to such detail. On the contrary, it is intended to cover all modifications, alterations, and equivalents falling within the spirit and scope of the appended claims.

What is claimed is:

1. An apparatus for controlling the transfer of interrupt signals to a processing unit according to predetermined levels of priority assigned to the interrupt signals, the apparatus comprising:
    a. means for storing each of the interrupt signals, said means including means for clearing an interrupt signal in response to the processing unit accepting said interrupt signal;
    b. means responsive to the storing means for generating a coded interrupt signal representing the highest priority interrupt signal contained in the storing means;
    c. a last-in first-out memory having an input connected to the generating means and having an output connected to the processing unit for transferring the highest priority coded interrupt signal in the memory to the processing unit; and
    d. means responsive to the generating means and the processing unit and connected to the memory for controlling the transfer of the coded interrupt signal to the memory in response to the coded interrupt signal having a priority equal to or higher than the highest priority coded interrupt signal currently in the memory, whereby the coded interrupt signal is transferred to the processing unit, said controlling means including means for shifting the next highest priority signal in the memory to the memory output in response to said processing unit executing the operation defined by the coded interrupt signal.

2. The apparatus of claim 1, wherein the storing means comprises:
    a. a number of storage elements, each storage element exclusively storing one of the interrupt signals as it occurs; and
    b. means responsive to the generating means and the processing unit and connected to the storage elements for resetting, in response to the processing unit accepting a coded interrupt signal, a storage element corresponding to the coded interrupt signal.

3. The apparatus of claim 2, wherein the last-in first-out memory comprises:
    a. a memory element having a plurality of storage locations and further having an input connected to the generating means and an output connected to the processing unit; and
    b. counter means having first and second inputs and having outputs connected to the memory element, said counter means causing the input and output of the memory element to respond to a higher storage location in response to a signal on the first input and to respond to a lower storage location in response to a signal on the second input.

4. The apparatus of claim 3, wherein the controlling means comprises:
    a. comparator means having inputs responsive to the generating means and the memory element and an output connected to the processing unit for producing a request signal in response to the coded interrupt signal having a priority equal to or greater than a signal currently on the output of the memory element; and
    b. means connected to the inputs of the counter means and responsive to
        1. an acknowledge signal generated by the processing unit in response to the request signal for causing the input and output of the memory element to respond to the higher storage location and further causing the coded interrupt signal to be transferred to said higher storage location, and
        2. a reset signal generated by the processing unit for causing the input and output of the memory element to respond to the lower storage location therein.

5. An apparatus for controlling the transfer of interrupt signals to a processing unit according to predetermined levels of priority assigned to the interrupt signals, said processing unit producing an acknowledge signal in response to a request signal generated by said apparatus and a reset signal in response to the execution of the interrupt requested, the apparatus comprising:
   a. means for storing each of the interrupt signals in a single storage element, said storing means including means for clearing a stored interrupt signal in response to an acknowledge signal produced in response to said stored interrupt signal;
   b. means responsive to the storing means for generating a coded signal representing the highest priority interrupt signal contained in the storing means;
   c. a last-in first-out memory responsive to the coded signal and producing an output signal to the processing unit representing the highest priority coded signal stored in the memory;
   d. means connected to the processing unit and responsive to the coded signal and the output signal for producing the request signal in response to the coded signal having a priority at least as high as the priority of the output signal; and
   e. means responsive to the processing unit and connected to the memory for causing in response to the acknowledge signal the coded signal to be transferred to the memory and become the output signal therefrom, said causing means further includes means for causing in response to the reset signal the next highest priority coded signal stored in the memory to become the output signal therefrom.

6. An apparatus for controlling the transfer of interrupt signals to a processing unit according to predetermined levels of priority assigned to said interrupt signals, said processing unit producing an acknowledge signal in response to a request signal generated by said apparatus and a reset signal in response to the execution of the requested interrupt, the apparatus comprising:
   a. a number of storage elements corresponding to the number of interrupt signals for producing a stored signal in response to the occurrence of an interrupt signal;
   b. an encoder element connected to the storage elements for generating a coded signal in response to a stored signal corresponding to the highest priority interrupt signal;
   c. a last-in first-out memory connected between the encoder element and the processing unit for storing the coded signals in order of descending priority and producing an output signal representing the highest priority coded signal stored, said memory having a first input to increment the output signal to a higher priority storage location and a second input to decrement the output signal to a lower priority storage location;
   d. a comparator circuit responsive to the encoder element and the memory and connected to the processing unit for producing the request signal in response to the coded signal having a priority equal to or higher than the output signal;
   e. means responsive to the processing unit and connected to the first and second inputs of the memory for
      1. incrementing the memory and transferring the coded signal to the higher priority storage location in response to the acknowledge signal, and
      2. decrementing the memory to the lower priority storage location in response to the reset signal; and
   f. means responsive to the processing unit and connected to the storage elements for resetting in response to the acknowledge signal the storage element containing the interrupt signal corresponding to the coded signal transferred to the memory.

* * * * *